Patented Mar. 29, 1927.

1,623,005

UNITED STATES PATENT OFFICE.

HANS GUBLER, HERMANN STAHEL, AND FRITZ STRAUB, OF BASEL, SWITZERLAND, ASSIGNORS TO THE FIRM SOCIETY OF CHEMICAL INDUSTRY IN BASLE, OF BASEL, SWITZERLAND.

AZO DYESTUFFS CONTAINING CHROMIUM AND PROCESS OF MAKING SAME.

No Drawing. Application filed June 21, 1926, Serial No. 117,615, and in Switzerland July 3, 1925.

The present invention relates to new azo-dyestuffs containing chromium; it comprises the new dyestuffs, the process of making same and the material dyed with the new dyestuffs.

The first step of the manufacture of the named dyestuffs consists in the preparation of unsulphonated ortho-hydroxy-azo-dyestuffs of the general formula

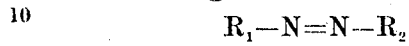

wherein $R_1$ represents a benzene nucleus containing at least one OH-group in ortho-position to the azo bridge and $R_2$ the residue of a 1-phenyl-5-pyrazolone to which the azo bridge is attached in 4-position and in which general formula at least one of the aromatic nuclei of the residues $R_1$ and $R_2$ contains at least one sulphamide group $—SO_2—NH_2$.

The second step consists in the preparation of the dyestuffs containing chromium by treating the new ortho-hydroxy-azo-dyestuffs of the above general formula with compounds of the trivalent chromium such as chromium hydroxide or oxide or the salts which these compounds form with acids or caustic alkalies. As agents yielding chromium there may be employed also salts of chromic acid, these compounds being transformed during the process into derivatives of the trivalent chromium.

The new azo-dyestuffs obtained by the first step of the process are dyestuffs adapted to be chromed, the dyestuffs containing chromium of the second step of the process are acid dyestuffs dyeing the animal fibre in an acid bath orange tints. They form orange-brown to brown powders, dissolving in water and in caustic soda solution of 10% strength to orange, in concentrated sulphuric acid to yellow solutions, dyeing wool in an acid bath orange tints of good properties of fastness. The dyeings are distinguished by remarkable properties of fastness and an excellent levelling power. The fastness to fulling and to light of the dyeings obtained on loose wool or cardings are particularly good.

As 1-phenyl-5-pyrazolones there come into consideration above all the pyrazolones described in the United States Patent No. 1,534,512, further the pyrazolones which may be obtained from unsulphonated aromatic amines, such as aniline, the toluidines, the aminophenol and aminocresol ethers and their halogen substitution products, or from the corresponding hydrazines and from an aceto acetic acid ester or an oxal acetic acid ester. As diazotization components there come into consideration, inter alia, the amides described in the French Patent No. 490177 and the simple ortho-aminophenols, as for instance the chloro and the nitro-aminophenols or cresols. The manner in which the chromium is bound to the dyestuffs is not known.

The following examples illustrate the invention, the parts being by weight:—

*Example 1.*

233 parts of 6-nitro-2-amino-1-hydroxy-benzene-4-sulphamide are dissolved in 600 parts of water and 150 parts of hydrochloric acid of 30% strength and diazotized at 5° with 69 parts of sodium nitrite. On the other hand a solution is prepared by dissolving 175 parts of 1-phenyl-3-methyl-5-pyrazolone in 300 parts of sodium carbonate and 2500 parts of water. This solution is cooled by adding ice and the diazo-solution prepared as indicated above is dropped into it while stirring. As soon as the diazo-compound has disappeared the mixture is heated gradually to 50° and the dyestuff corresponding with the formula

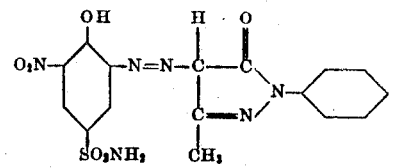

is salted out and isolated in the usual manner.

It dyes wool in an acid bath yellow red tints, which change towards orange when after-chromed. The 6-nitro-2-amino-1-hydroxybenzene-4-sulphamide used in this example may be made as follows:—

188 parts of finely ground 2-amino-1-hydroxybenzene-4-sulphamide are introduced, while stirring and at a temperature between 30° and 40° C. into 752 parts of sulphuric acid of 66° Bé. Stirring is continued until solution is complete; the solution is cooled to —5° C. and there are dropped into it, at a temperature of —5° to 0° C., 130 parts of a mixture of nitric acid and sulphuric acid containing 48.6 per cent $HNO_3$. After this addition is complete the mixture is maintained for some time longer at a low temperature, then poured upon 2000 parts of ice and neutralised with milk of lime, the temperature not being allowed to rise above 60° C.; the mass is then filtered from calcium sulphate and the calcium salt is transformed into the sodium salt. The solution thus obtained may be used directly for the manufacture of the dyestuff. The 6-nitro-2-amino-1-hydroxybenzene-4-sulphamide is freely soluble in water and alcohol and sparingly soluble in ether. When once recrystallized from alcohol it melts at 191° C.

*Example 2.*

188 parts of 2-amino-1-hydroxybenzene-4-sulphamide are dissolved in 600 parts of water and 150 parts of hydrochloric acid of 30 per cent strength. The solution is diazotized at 5° C. with 69 parts of sodium nitrite and then stirred in an ice-cold solution of 253 parts of 1-(3'-sulphamido)-phenyl-3-methyl-5-pyrazolone, kept alkaline with sodium carbonate. When the reaction is finished the dyestuff corresponding with the formula

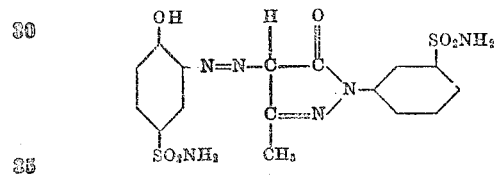

which has completely separated, is filtered. By solution in water at 85–90° C. and recrystallization it can be purified.

In like manner there may be obtained a dyestuff from 4-nitro-2-amino-1-hydroxybenzene and 1-(3'-sulphamido)-phenyl-3-methyl-5-pyrazolone or 1-(3'-sulphamido)-phenyl-5-pyrazolone-3-carboxylic acid.

*Example 3.*

45.2 parts of the azo-dyestuff from 2-amino-1-hydroxybenzene-4-sulphamide and 1-(3'-sulphamido-phenyl-3-methyl-5-pyrazolone are dissolved in 1000 parts of boiling water, and the solution is mixed with a solution of chromium formate corresponding with 15.2 parts of $Cr_2O_3$, the whole being boiled for a long time in a reflux apparatus. The chromium compound is isolated by salting out. It is an orange brown powder, soluble in water to an orange solution, in caustic soda solution of 10 per cent. strength to an orange solution and in concentrated sulphuric acid to a yellow solution; it dyes wool in an acid bath orange tints with good properties of fastness.

*Example 4.*

45.2 parts of the azo-dyestuff from 2-amino-1-hydroxybenzene-4-sulphamide and 1-(3'-sulphamido)-phenyl-3-methyl-5-pyrazolone are dissolved in 1000 parts of boiling water. The solution is mixed with an aqueous solution of sodium chromate corresponding with 9.5 parts of $Cr_2O_3$ and 52.8 parts of ammonium sulphate and the whole is boiled in a reflux apparatus until no further change of colour is detected in the solution. The chromiferous dyestuff is then isolated by salting out. It is similar to the dyestuff of the preceding example. With alkali metal chromites, one obtains a similar dyestuff.

*Example 5.*

49.7 parts of the dyestuff from 6-nitro-2-amino-1-hydroxybenzene-4-sulphamide and 1-phenyl-3-methyl-5-pyrazolone are dissolved in 500 parts of hot water and the solution is mixed with one of chromium acetate corresponding with 15.2 parts of $Cr_2O_3$ and the whole is boiled for a long time in a reflux apparatus.

The chromium compound is obtained by salting out. It is an orange brown powder, soluble in water to an orange solution, in caustic soda solution of 10 per cent strength to an orange solution and in concentrated sulphuric acid to a yellow solution; it dyes wool in an acid bath orange tints having good properties of fastness.

*Example 6.*

A paste of hydrated chromium oxide containing 40 parts of water and corresponding with 8.5 parts of $Cr_2O_3$, 24 parts of caustic potash and 9 parts of glycerin is heated until the whole is dissolved, whereupon 150 parts of water are added; 48.2 parts of the dyestuff from 2-amino-1-hydroxybenzene-4-sulphamide and 1-(3'-sulphamido)-phenyl-3-carboxyl-5-pyrazolone are added to the solution and the whole is boiled in a reflux apparatus until there is no further change in the colour of the solution. Water is now added and the liquid is made neutral by means of mineral acid and the dyestuff is salted out, filtered and dried. It is a brown powder which dissolves in water to an orange solution, in caustic soda solution of 10 per cent. strength to an orange solution and in concentrated sulphuric acid to a yellow solution. It dyes wool in an acid bath orange tints of good properties of fastness.

What we claim is:

1. As a step in the process of making acid azo-dyestuffs containing chromium the preparation of unsulphonated o-hydroxy-azo dyestuffs corresponding with the general formula

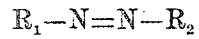

wherein $R_1$ represents a benzene nucleus containing at least one OH-group in ortho-position to the azo bridge and $R_2$ the residue of a 1-phenyl-5-pyrazolone to which the azo bridge is attached in 4-position, by coupling an unsulphonated ortho-hydroxy-azo-compound of the benzene series with an unsulphonated 1-phenyl-5-pyrazolone these components being such that at least one of them contains at least one sulphamide group —SO₂NH₂.

2. As a step in the process of making acid azo-dyestuffs containing chromium the preparation of unsulphonated ortho-hydroxy-azo-dyestuffs corresponding with the general formula

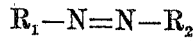

wherein R₁ represents a benzene nucleus containing at least one OH-group in ortho-position to the azo bridge and R₂ the residue of a 1-phenyl-3-methyl-5-pyrazolone to which the azo bridge is attached in 4-position, by coupling an unsulphonated ortho-hydroxy-azo-compound of the benzene series with an unsulphonated 1-phenyl-3-methyl-5-pyrazolone these components being such that at least one of them contains at least one sulphamide group —SO₂NH₂.

3. As a step in the process of making acid azo-dyestuffs containing chromium the preparation of unsulphonated ortho-hydroxy-azo-dyestuffs corresponding with the general formula

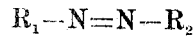

wherein R₁ represents a benzene nucleus containing at least one sulphamide group and an OH-group in ortho-position to the azo bridge and R₂ the residue of a 1-(3'-sulphamido)-phenyl-3-methyl-5-pyrazolone to which the azo bridge is attached in 4-position, by coupling an unsulphonated ortho-hydroxy-azo-compound of the benzene series containing at least one sulphamide group —SO₂NH₂ with an unsulphonated 1-(3'-sulphamido)-phenyl-3-methyl-5-pyrazolone.

4. As a step in the process of making acid azo-dyestuffs containing chromium the preparation of the dyestuff corresponding with the formula

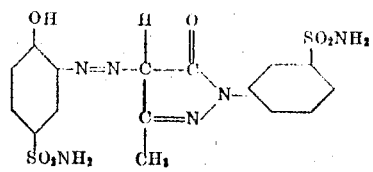

by coupling the diazotized 2-amino-1-hydroxybenzene-4-sulphamide with the 1-(3'-sulphamido)-phenyl-3-methyl-5-pyrazolone.

5. As a step in the process of making acid azo-dyestuffs containing chromium the herein described treatment of the dyestuffs corresponding with the general formula

wherein R₁ represents a benzene nucleus containing at least one OH-group in ortho-position to the azo bridge and R₂ the residue of a 1-phenyl-5-pyrazolone to which the azo bridge is attached in 4-position and wherein at least one of the residues R₁ and R₂ contains at least one group —SO₂NH₂ with compounds of trivalent chromium.

6. As a step in the process of making acid azo-dyestuffs containing chromium the herein described treatment of the dyestuff corresponding with the general formula

wherein R₁ represents a benzene nucleus containing at least one OH-group in ortho-position to the azo bridge and R₂ the residue of a 1-phenyl-5-pyrazolone to which the azo bridge is attached in 4-position and wherein at least one of the residues R₁ and R₂ contains at least one group —SO₂NH₂ with trivalent salts of chromium.

7. As a step in the process of making acid azo-dyestuffs containing chromium the herein described treatment of the dyestuff corresponding with the general formula

wherein R₁ represents a benzene nucleus containing at least one OH-group in ortho-position to the azo bridge and R₂ the residue of a 1-phenyl-3-methyl-5-pyrazolone to which the azo bridge is attached in 4-position and wherein at least one of the residues R₁ and R₂ contains at least one group —SO₂NH₂ with trivalent salts of chromium.

8. As a step in the process of making acid azo-dyestuffs containing chromium the herein described treatment of the dyestuff corresponding with the general formula

wherein R₁ represents a benzene nucleus containing at least one sulphamide group and an OH-group in ortho-position to the azo bridge and R₂ the residue of a 1-(3'-sulphamido)-phenyl-3-methyl-5-pyrazolone to which the azo bridge is attached in 4-position with the trivalent salts of chromium.

9. As a step in the process of making acid azo-dyestuffs containing chromium the herein described treatment of the dyestuff corresponding with the formula

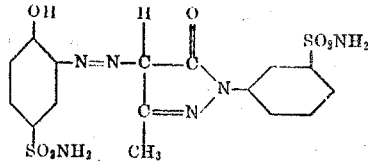

with trivalent salts of chromium.

10. As new products the azo-dyestuffs containing chromium, derivatives of the unsulphonated ortho-hydroxy-azo-dyestuffs corresponding with the general formula

wherein $R_1$ represents a benzene nucleus containing at least one OH-group in ortho-position to the azo bridge and $R_2$ the residue of a 1-phenyl-5-pyrazolone to which the azo bridge is attached in 4-position and wherein at least one of the residues $R_1$ and $R_2$ contains at least one group —$SO_2HN_2$, which products form orange-brown to brown powders, dissolving in water and in caustic soda solution of 10% strength to orange, in concentrated sulphuric acid to yellow solutions, dyeing wool in an acid bath orange tints of good properties of fastness.

11. As new products the azo-dyestuffs containing chromium, derivatives of the unsulphonated ortho-hydroxy-azo-dyestuffs corresponding with the general formula $$R_1-N=N-R_2$$

wherein $R_1$ represents a benzene nucleus containing at least one OH-group in ortho-position to the azo bridge and $R_2$ the residue of a 1-phenyl-3-methyl-5-pyrazolone to which the azo bridge is attached in 4-position and wherein at least one of the residues $R_1$ and $R_2$ contains at least one group —$SO_2NH_2$, which products form orange-brown to brown powders, dissolving in water and in caustic soda solution of 10% strength to orange, in concentrated sulphuric acid to yellow solutions, dyeing wool in an acid bath orange tints of good properties of fastness.

12. As new products the azo-dyestuffs containing chromium, derivatives of the unsulphonated ortho-hydroxy-azo-dyestuffs corresponding with the general formula $$R_1-N=N-R_2$$

wherein $R_1$ represents a benzene nucleus containing at least one sulphamide group and an OH-group in ortho-position to the azo bridge and $R_2$ the residue of a 1-(3'-sulphamido)-phenyl-3-methyl-5-pyrazolone to which the azo bridge is attached in 4-position, which products form orange-brown to brown powders, dissolving in water and in caustic soda solution of 10% strength to orange, in concentrated sulphuric acid to yellow solutions, dyeing wool in an acid bath orange tints of good properties of fastness.

13. As a new product, the azo-dyestuffs containing chromium derivative of the ortho-hydroxy-azo-dyestuff corresponding with the formula

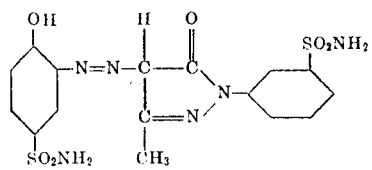

which dyestuff forms an orange-brown powder, dissolving in water and in caustic soda solution of 10% strength to an orange, in concentrated sulphuric acid to a yellow solution, dyeing wool in an acid bath orange tints with good properties of fastness.

14. Material dyed with the dyestuffs of claim 10.

15. Material dyed with the dyestuffs of claim 11.

16. Material dyed with the dyestuffs of claim 12.

17. Material dyed with the dyestuffs of claim 13.

In witness whereof we have hereunto signed our names this 9th day of June 1926.

HANS GUBLER.
HERMANN STAHEL.
FRITZ STRAUB.